United States Patent Office 2,780,613
Patented Feb. 5, 1957

2,780,613

THERMOPLASTIC COPOLYMERS OF MONOVINYL-BENZENE COMPOUNDS AND HIGH MOLECULAR WEIGHT POLYESTERS OF ETHYLENE-ALPHA, BETA-DICARBOXYLIC ACIDS

Louis C. Rubens, Midland, Mich., assignor to The Dow Chemical Company, Midland, Mich., a corporation of Delaware No Drawing. Application October 2, 1952,
Serial No. 312,865

6 Claims. (Cl. 260—45.4)

This invention relates to copolymers, and to the preparation of such copolymers, of monovinylbenzene compounds and reactive resins of the alkyd type, particularly to copolymers of styrene and certain high molecular weight, elastic, linear, reactive polyesters of ethylene-alpha,beta-dicarboxylic acids. By "ethylene-alpha,beta-dicarboxylic acid" is meant a monoolefinic dicarboxylic acid having a carboxylic acid radical attached to each of the two carbon atoms joined by the olefinic linkage.

It is known that styrene will copolymerize with reactive alkyd resins, and copolymers of styrene with reactive unsaturated alkyd resins have been disclosed. It is also known that linear polyesters of alpha,beta-unsaturated dicarboxylic acids are reactive with styrene and will copolymerize therewith.

I have now discovered that copolymers not previously disclosed and having the property of remarkable toughness and resistance to breakage not previously realized can be obtained by inter-reacting and copolymerizing monovinylbenzene compounds, particularly styrene, and certain high molecular weight, elastic, linear, reactive polyesters.

One of the objects of this invention is to provide copolymer resins suitable for making useful articles.

Another object is to provide copolymer resins of monovinylbenzene compounds, particularly of styrene, characterized by increased toughness and greater resistance to breakage, i. e. having higher impact strength than polystyrene.

These and other objects are attained by copolymerizing a monovinylbenzene compound and certain reactive polyesters. The reactive polyesters particularly adapted to this invention are high molecular weight, highly elastic, linear polyester reaction products obtained by esterifying certain dihydric alcohols with certain dicarboxylic acids comprising an ethylene-alpha,beta-dicarboxylic acid, and reacting such preformed polyesters with a highly reactive, difunctional organic coupling agent selected from the class consisting of diisocyanates and diketenes, i. e. organic compounds substituted by two isocyanate groups or two ketene groups as the only readily reactive groups in the molecule.

Polyesters are obtained by esterification reactions between polyhydric alcohols and polybasic acids and ester-forming derivatives thereof. Linear polycarboxylic esters are obtained by esterification reactions between dihydric alcohols and dicarboxylic acids. The linear polyesters particularly useful in this invention are those which are elastic and rubbery at room temperature as contrasted with those which are crystalline and fiber-forming; the latter are unsuited for accomplishing the objects of this invention. An elastic and rubbery polyester is generally one which has a low second-order transition temperature or is at a temperature above its second-order transition temperature.

Elastic and rubbery polyesters may be obtained from such dihydric alcohols and such dicarboxylic acids that the molecular structure of either one or the other or both of the reactants has a branched carbon chain.

Particularly suitable for use in making the elastic polyesters employed in making the copolymers of this invention are the branched carbon chain saturated aliphatic dihydroxy-hydrocarbons such as 1,2-propylene glycol, 2,2-dimethylpropanediol-1,3, and 1,3-butylene glycol. Unbranched, straight-chain dihydric aliphatic glycols such as ethylene glycol, trimethylene glycol, hexamethylene glycol and decamethylene glycol are suitable if polyesterified with branched-chain dicarboxylic acids. The dihydric ether-alcohols such as diethylene glycol and triethylene glycol are generally less satisfactory because of the instability of the oxygen bridge and because such compounds tend to form undesirable color-bodies in the copolymer product.

In order to be reactive with styrene and to copolymerize therewith, the polyester chain must comprise a polymerizably reactive unsaturated group. The polyesters suitable for the copolymers of this invention comprise polymerizably reactive unsaturated groups which are radicals of ethylene-alpha,beta-dicarboxylic acids. Suitable polyesters are those made by polyesterification reactions in which a part of the dicarboxylic acid reactant is an ethylene-alpha,beta-dicarboxylic acid. The molecular structure of ethylene-alpha,beta-dicarboxylic acids and esters contains the group $$-\text{O}-\overset{\text{O}}{\underset{\|}{\text{C}}}-\text{C}=\text{C}-\overset{\text{O}}{\underset{\|}{\text{C}}}-\text{O}-$$

Examples of such ethylene-alpha,beta-dicarboxylic acids are maleic acid, fumaric acid, citraconic acid and chloromaleic acid.

As will be explained below, the proportion of the polymerizably reactive radicals in the polyester must be limited. Therefore, in addition to the radicals of ethylene-alpha,beta-dicarboxylic acids, the polyesters suitable for the copolymers of this invention comprise the radicals of functionally saturated, non-ethylenic polyester-forming acids, i. e. dicarboxylic acids having no unsaturation functionally capable of copolymerizing with polymerizable vinyl-type compounds. Suitable functionally saturated, non-ethylenic dicarboxylic acids include adipic, beta-methyladipic, pimelic, suberic, azeleic, sebacic, phthalic and terephthalic acids. The polyesters may also comprise long chain hydroxy aliphatic carboxylic acid radicals, e. g. the polyesterification reaction product of 12-hydroxystearic acid.

Polyesters may be made from mixtures of one or more dihydric alcohols and one or more dicarboxylic acids or ester-forming derivatives of such acids.

The polyesters for use in this invention must have a relatively high molecular weight, i. e. an average molecular weight of at least 5,000 and preferably of 10,000 or more. By direct esterification methods it is difficult to prepare polyesters having average molecular weights over 5,000. A polyester may be made, for example, by mixing a dicarboxylic acid and a dihydric alcohol together, with the dihydric alcohol in at least a slight excess over the stoichiometric equivalent of the acid, and heating the mixture, usually with bubbling of inert gas through the reaction mixture to prevent contact of the reaction mixture with air and to assist in carrying away the volatile by-products of the esterification reaction. The anhydrides, acid chlorides, or low-molecular weight monohydric alcohol esters may be used instead of the acids. The reaction is usually carried out in the substantial absence of unreactive solvents and is usually continued until there is some evidence that the polyesterification reaction is reasonably complete, e. g. a low or constant acid value, a constant viscosity, or the cessation of evolution of volatile by-products. As ordinarily made by direct esterification processes, the polyesters are usually of relatively low molecular weight, i. e. below 5,000. Such low molecular weight polyesters, even if otherwise properly constituted, are not satisfactory for the purposes of the present invention.

Low molecular weight polyesters, such as those made by direct esterification methods, can be readily converted to high molecular weight polyesters by reaction with diketenes or diisocyanates, particularly when the polyester molecules have terminal hydroxyl groups.

Polyesters of dihydric alcohols and dicarboxylic acids may be considered to have a structure expressed as

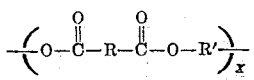

wherein the group

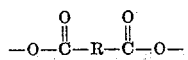

is the radical of the dibasic acid $HO_2C-R-CO_2H$ and $-R'-$ is the radical of the dihydric alcohol $HO-R'-OH$, where $-R-$ and $-R'-$ are divalent organic radicals having the radical valences on carbon atoms. The group

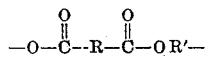

is referred to as the "structural unit" of the polyester and X is the number of structural units in the average polyester molecule; X is sometimes called the "degree of polyesterification." When polyesters are made by esterification of dicarboxylic acids and an excess of dihydric alcohol, the polyester product usually contains a large proportion of polyester molecules having mono-esterified dihydric alcohol radicals on both ends of the polyester chain. Such polyester molecules are said to be "hydroxy-terminated" and may be illustrated by the expression $HO\{ester\}_xOH$ wherein the $-OH$ groups are hydroxyl groups attached to the dihydric alcohol radicals on the ends of the polyester molecule and X is the average degree of polyesterification.

Both diketenes and diisocyanates are very reactive with hydroxyl groups. The ketene group $>C=C=O$ reacts with a hydroxyl group to form an ester linkage

The isocyanate group $-N=C=O$ reacts with a hydroxyl group to form a carbamate linkage

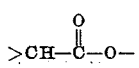

Diketenes and diisocyanates serve as coupling agents between molecules having hydroxyl groups. When organic compounds having two ketene groups or two isocyanate groups react as coupling agents between molecules having two hydroxyl groups, a chain-lengthening condensation reaction takes place.

By reaction of hydroxy-terminated polyesters with diketenes or diisocyanates as coupling agents, longer polyester molecules are formed which may be illustrated as having the structure $\{(ester)_x-coupler\}_Y$ wherein the group $-(ester)_x-$ is the radical of the hydroxy-terminated polyester having a degree of polyesterification of X, the group $-coupler-$ is the radical corresponding to the diketene or diisocyanate used as coupling agent, and Y is a measure of the extent of coupling, or the number of hydroxy-terminated polyester molecules which have been coupled together in the average coupled polyester molecule. The product XY is the number of structural units, or the degree of polyesterification of the coupled polyester.

For the purpose of this invention, the degree of polyesterification of the coupled polyester should be more than 20, and preferably more than 50.

Examples of diketenes suitable for making the high molecular weight, coupled polyesters useful in the copolymers of this invention are 2,9 - dimethyl - 1,9-decadiene-1,10-dione having the structural formula

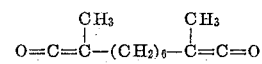

3,10 - dicarbonyl - 2,11 - dodecanedione having the structural formula

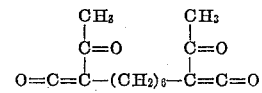

and carbon suboxide having the structural formula

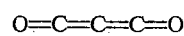

Suitable diisocyanates are the polymethylene diisocyanates such as ethylene diisocyanate, trimethylene diisocyanate, tetramethylene diisocyanate, hexamethylene diisocyanate, decamethylene diisocyanate, etc., and the aromatic diisocyanates such as meta-toluene diisocyanate

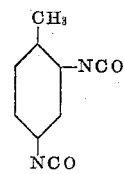

and 1,5-naphthalene diisocyanate

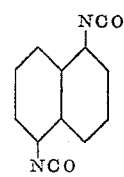

The coupled polyester may be formed by adding to a polyester, or to a mixture of polyesters, which, having been prepared from an excess of glycol, comprise molecules terminated with hydroxyl radicals, a quantity of diketene or of diisocyanate stoichiometrically equivalent to the hydroxyl radicals of the polyester, usually not more than 20 parts of diketene or of diisocyanate per 100 parts of polyester, and holding the mixture at a reaction temperature for a time sufficient to effect the necessary degree of coupling. The coupling may be effected by standing at room temperature for several days, or in shorter times by heating to temperatures not above the decomposition temperature.

The most desirable copolymers of monovinylbenzene compounds and unsaturated polyesters are made from coupled polyesters which are derived from dicarboxylic acids comprising an ethylene-alpha,beta-dicarboxylic acid in an amount equivalent to from about 1 to 30 mole percent of the total dicarboxylic acids combined in the coupled polyester. This proportion of unsaturated dicarboxylic acid radicals in the coupled polyester may be obtained in any of several ways. For example, a polyester may be prepared from a chosen mixture of saturated and unsaturated dicarboxylic acids in which the unsaturated dicarboxylic acid is from 1 to 30 mole percent of the total dicarboxylic acid, and a glycol, or mixture of glycols, in slight molecular excess over the acids, and the polyester product be coupled by reaction with a diketene or diisocyanate. Coupled polyesters of the desired degree of unsaturation may also be prepared by taking a mixture of two or more preformed polyesters of different degrees of unsaturation and reacting that mixture with a diketene or diisocyanate coupling agent. For example, one molecular equivalent of a polyester derived from ten mole percent unsaturated dicarboxylic acid based on the total dicarboxylic acids, mixed with one molecular equivalent of a polyester derived from saturated dicarboxylic acids, and coupled with a difunctional coupling agent, makes a coupled polyester having 5 mole percent unsaturated acid based on the total dicarboxylic acids employed. The second of these procedures is the more convenient from a manufacturing viewpoint since it permits the use, as at least part of the starting materials, of a saturated polyester which is stable in storage and is not sensitive to reaction with oxygen or air and does not tend to gel on standing. Such practice requires a minimum inventory of the more sensitive, less stable, unsaturated polyesters. Furthermore, a process based on coupling a mixture of unsaturated polyester and saturated polyester permits a wide choice of degree of unsaturation in the final product by the simple means of varying the relative proportions of the primary polyesters to be coupled. Thus, simplicity and economy are combined with flexibility of manufacture.

The most desirable copolymers of monovinylbenzene compounds and the unsaturated polyesters of this invention are ones containing not more than 2, preferably from 0.1 to 1.5, percent by weight of the ethylene-alpha, beta-dicarboxylic acid chemically combined therein. The quantity of the unsaturated polyester required to be equivalent to the stated proportion of combined unsaturated dicarboxylic acid in the copolymer depends on the kind and composition of the polyester. For example, in order to make a copolymer resin containing a particular proportion of polyesterified unsaturated acid, more unsaturated polyester will be necessary if the polyester is based upon a relatively small proportion of unsaturated acid than will be necessary if the polyester if based upon a relatively large proportion of unsaturated acid. The composition of unsaturated polyester should be so chosen that not less than about 1 and not more than about 40, preferably not less than 2 nor more than 30, weight percent unsaturated polyester based on the resin copolymer is necessary to obtain the desired proportion of chemically combined unsaturated acid in the copolymer product.

The monovinylbenzene compounds to which this invention pertains are those in which one $CH_2=CH-$ group is attached directly to a carbon atom of the benzene ring, including those in which the benzene ring is further substituted by other groups, particularly by alkyl groups and/or chlorine atoms, attached to other carbon atoms of the benzene ring; i. e., the invention pertains particularly to styrene and to styrene nuclearly substituted by alkyl groups and/or chlorine. Examples of such styrene derivatives are p-methylstyrene, m-methylstyrene, p-ethylstyrene, p-isopropylstyrene, 2,4-dimethylstyrene, p-chlorostyrene, 2-chloro-4-methylstyrene, and 2,4-dichlorostyrene. Mixtures of monovinylbenezne compounds with each other or with minor proportions of other polymerizable materials may be copolymerized with the coupled unsaturated polyesters. The monovinylbenzene compound is preferably employed in its monomeric form, although a partially polymerized material containing predominately monomer may be used. The polymerizable materials may also contain minor amounts of non-polymerizable substances, such as plasticizers, mold lubricants, coloring agents, opacifiers, pearlescents, fillers, etc.

The copolymers of this invention may be prepared by interpolymerizing monovinylbenzene compounds and the partially unsaturated coupled polyester in the presence or absence of non-reactive solvents. A simple yet practical method of preparation is to mix a selected coupled unsaturated polyester in a desired proportion with the monovinylbenzene compound and to heat the mixture in the absence of air until interpolymerization is complete. Usually, moderate temperatures are employed at the beginning of the interpolymerization when the exothermic reaction is rapid and considerable heat is being evolved, and the temperature is usually raised near the end of the reaction to complete the interpolymerization. A commonly used time-temperature schedule for such interpolymerization is:

3 days at a temperature of about 80° C.,
1 day at a temperature of about 100° C.,
1 day at a temperature of about 125° C., and
1 day at a temperature of about 150° C.

Other schedules may be employed if desired. The polymerization is usually run without added catalysts, but catalysts may be used to accelerate the reaction and decrease the time necessary for polymerization. Suitable catalysts are the organic peroxygen compounds such as the acidic peroxides, e. g. benzoylperoxide, the hydrocarbon peroxides, e. g. cumene hydroperoxide and ascaridol, and the alcohol peroxides, e. g. tertiary-butyl peroxide. Such catalysts, if used, are employed in only small amounts, usually not more than 5 weight percent of the polymerizable mixture.

In the absence of added catalysts and at room temperature, copolymerizable mixtures of monomeric monovinylbenzene compounds and high molecular weight, partially unsaturated, coupled polyester reaction products are usually relatively stable and slow to polymerize. In the form of such polymerizable liquid compositions, these mixtures may be used as laminating resins, as impregnating agents for porous or fibrous structures, as coating materials, as casting or potting agents, or as components thereof. The liquid polymerizable compositions may thereafter be converted in situ to tough, impact-resistant copolymer resin compositions, the interpolymerization being effected by heating, as previously described. When it is desirable to use catalysts in the polymerizable composition, it is preferable to prepare and to store the polymerizable mixture without any added catalyst and to add the catalyst immediately before using the polymerizable mixture. Polymerizable compositions containing catalysts may sometimes be stored for limited times without change in the compositions by holding the temperature of the composition below the minimum temperature necessary for initiating the polymerization reaction.

The copolymer resins, produced by interpolymerization of the polymerizable compositions of monovinylbenzene compounds and high molecular weight, partially unsaturated, coupled polyesters as herein described, are thermoplastic and may be softened by heat and shaped under pressure, as by compression molding or by other conventional procedures, into molded articles, sheets and other shapes, or bonded as coating layers on base structures or between base structures as binding agents; upon cooling, the softened plastic mass again becomes hard, tough and impact-resistant.

The preparation of certain polyester intermediate products which will be referred to as A–F, respectively, and the preparation of copolymers of some of these with styrene, will now be described.

In these preparations and examples, parts are by weight unless otherwise noted.

PREPARATION OF POLYESTER A

A polyester was prepared from the following mixture:

1.08 gram-moles 1,2-propylene glycol
0.945 gram-mole sebacic acid
.05 gram-mole phthalic anyhydride
.03 gram-mole fumaric acid The mixture was stirred and heated in a conventional esterification vessel while a slow stream of dry nitrogen gas was bubbled through the reaction mixture. The temperature was maintained at about 160° C. for about 24 hours, gradually raised to about 180° C. for about 10 hours, and finally increased to about 200° C. for about 48 hours. The polyester had an average molecular weight (as determined from vicosity measurements) of about 2,200. It is calculated that approximately 2.92 mole percent of all of the carboxylic acid radicals of the polyester are provided by the chemically combined fumaric acid.

PREPARATION OF COUPLED POLYESTER B

A high molecular weight polyester was prepared from polyester A by coupling with meta-toluene diisocyanate. The coupling was accomplished by adding 100 parts of polyester A to 1 part meta-toluene diisocyanate and maintaining the mixture at room temperature for three days. The molecular weight could not be accurately determined because of the very high viscosity of the resulting coupled product, but is believed to be about 13,000, which is equivalent to about 53 structural units per coupled polyester molecule.

PREPARATION OF POLYESTER C

By a procedure similar to that used in preparation of polyester A, a polyester was made from the following mixture:

1.08 gram-moles 1,2-propylene glycol
1.0 gram-mole sebacic acid

The resulting propylene sebacate polyester had an average molecular weight of about 1850, representing a "degree of polymerization" of about 7.6 (an average of about 7.6 propylene sebacate structural units per polyester molecule).

PREPARATION OF COUPLED POLYESTER D

To 100 parts of the propylene sebacate polyester C was added 1 part of meta-toluene diisocyanate and the mixture was kept at room temperature for several days. The molecular weight of the resulting coupled polyester was about 11,200, or about a 6-fold increase over the polyester C from which it was derived.

PREPARATION OF POLYESTER E

By a procedure similar to that used in making polyester A, a polyester was made from the following mixture:

1.0 gram-mole 1,2-propylene glycol
0.5 gram-mole fumaric acid
0.5 gram-mole sebacic acid In this polyester, the ethylene-alpha, beta-dicarboxylic acid, fumaric acid, represents 50 mole percent of the total acids combined in the polyester. The molecular weight of the propylene glycol fumarate-sebacate polyester was about 2500 to 3000.

PREPARATION OF COUPLED POLYESTERS F

A series of high molecular weight coupled polyesters, identified as polyesters F–1 through F–5, was made by mixing various proportions of the previously described propylene sebacate polyester C (a completely saturated polyester) and the previously described propylene glycol fumarate-sebacate polyester E (partially unsaturated polyester) and coupling the mixture of preformed polyesters by reaction at room temperature with 1 percent, based on the mixture of polyesters, of meta-toluene diisocyanate. The compositions of the coupled polyesters F–1 through F–5, respectively, are given in Table 1. In the table are shown the proportions in parts by weight of polyester C and of polyester E, respectively, which were mixed and chemically coupled by reaction with meta-toluene diisocyanate in each of the coupled polyesters. Also shown is the proportion of chemically combined fumaric acid, computed as the mole percent of free fumaric acid, based on the total dicarboxylic acids chemically combined in each of the coupled polyesters F–1 through F–5, respectively.

*Table I*

| Coupled Polyester | Composition, Parts | | Fumaric Acid, Mole Percent |
|---|---|---|---|
| | Polyester C | Polyester E | |
| F–1 | 95 | 5 | 3 |
| F–2 | 90 | 10 | 5.9 |
| F–3 | 80 | 20 | 11.8 |
| F–4 | 50 | 50 | 27.3 |
| F–5 | 0 | 100 | 50.0 |

The molecular weights of the coupled polyesters F–1 through F–5 were about 12,000 to 15,000, equivalent to about 50 to about 75 structural units in the average coupled polyester molecule.

The polyesters and coupled polyesters, the preparation of which has just been described, were employed in making polymeric styrene resin products as described in the examples below, which examples are illustrative but not limiting as to the invention.

EXAMPLE 1

This example illustrates the making of a tough copolymer of styrene and a high molecular weight, unsaturated, linear, coupled polyester.

A copolymer of styrene and a high molecular weight, linear, coupled polyester containing a polymerizing reactive ethylenic group was prepared by interpolymerizing a mixture of 94 parts of styrene and 6 parts of the aforementioned polyester B. The polyester B, as previously described, is a propylene glycol polyester of a mixture of sebacic acid and minor amounts of phthalic acid and fumaric acid, the polyester having been coupled by reaction with meta-toluene diisocyanate. The mixture of styrene and polyester B was sealed in a glass ampoule and interpolymerized by keeping at a temperature of about 80° C. for three days, at 100° C. for one day, at 125° C. for one day, and at 150° C. for one day. The copolymer was a light tan, clear, tough resin.

For purpose of comparison with the copolymer just described, a homopolymer of styrene was made from monomeric styrene by heating in a sealed glass ampoule at the same temperatures and for the same times as were used in making the copolymer. The homopolymer of styrene so produced was a clear, hard resin.

Also for purpose of comparison with the tough copolymer of styrene first described in this example, and to show the necessity of having a polymerizably reactive unsaturated group in the polyester chain in order to form, with styrene, a tough copolymer, a mixture of 90 parts of styrene and 10 parts of the aforementioned polyester D was polymerized in a sealed glass ampoule by heating at the same temperatures and for the same times as were used in making the aforementioned copolymer. The resin product was opaque and brittle and was probably not a "copolymer" but a mixture of polystyrene and polyester, the latter being completely saturated coupled polyester, propylene sebacate, coupled with meta-toluene diisocyanate, and having no polymerizably reactive group.

Each of the three resins described in this example was compression molded into test bars having a rectangular cross-section of ½ inch by 1/10 inch. The impact strength of the resin compositions was determined on these test bars by a modified Izod method. In this modified Izod test, the test piece is clamped firmly by one end and struck a sharp blow by a swinging pendulum delivering at the point of contact 10 inch-pounds of energy at a linear velocity of 11 feet per second against the ½-inch width of the test bar, in the direction of the 1/10-inch thickness, at a distance of 0.140 inch from the jaws of the holding clamp.

The impact strengths so determined on the three resins of this example are shown in Table II in terms of inch-pounds required to break the respective test bars. The table also shows, for the copolymer resin, the percent by weight of unsaturated acid chemically combined in the resin.

Table II

| Resin | Composition, Parts | Unsaturated Acid, Weight Percent | Impact Strength, Inch-Pounds |
|---|---|---|---|
| Copolymer | Styrene, 94 / Polyester B, 6 | 0.0845 | bent, but did not break. |
| Homopolymer | Styrene, 100 | none | 0.28. |
| Mixture | Styrene, 90 / Polyester D, 10 | none | 0.38. |

Too high to be measured by this test, the impact strength of the copolymer of styrene and polyester B is remarkable when compared with either the homopolymer of styrene or with the resin made by polymerizing styrene with polyester D. It will be noted that polyesters B and D are both high molecular weight, linear coupled polyesters. Both polyesters were made from 1,2-propylene glycol. Both were made from dicarboxylic acids, predominately sebacic acid. Both have been coupled with meta-toluene diisocyanate to make a high molecular weight coupled polyester. Yet polyester B, comprising fumaric acid to the extent of 2.92 mole percent of the acids combined in the polyester, copolymerized with styrene to form a resin which has an unusually high impact strength, while the resin formed by polymerizing styrene in the presence of saturated polyester D has but a low impact strength, comparable to that of the styrene homopolymer.

EXAMPLE 2

This example shows the effect of varying degrees of unsaturation in the high molecular weight polyesters on the impact strength of the styrene copolymers made therefrom.

A series of copolymers, hereinafter referred to as copolymers 1–5, was made by interpolymerizing 90 parts of styrene and 10 parts of one of the aforementioned coupled polyesters F–1 to F–5, by keeping the mixtures in sealed glass ampoules for three days at a temperature of about 80° C., for one day at 100° C., for one day at 125° C., and for one day at 150° C. The copolymers were compression molded at a temperature of 160° C. into test bars having a rectangular cross-section of ½ inch by 1/10 inch. The impact strength of the copolymers, determined on these test bars in the modified Izod impact test described in Example 1, is shown in Table III in terms of inch-pounds at break. The table shows the proportion of chemically combined fumaric acid, computed as the mole percent of free fumaric acid, based on the total dicarboxylic acids chemically combined in each of the coupled polyesters F–1 through F–5, respectively. The table shows the percent by weight of fumaric acid chemically combined in each copolymer.

Table III

| Copolymer | Polyester Combined In Copolymer | Fumaric Acid, Mole Percent In Polyester | Fumaric Acid, Weight Percent In Copolymer | Impact Strength, In.-lbs. |
|---|---|---|---|---|
| 1 | F–1 | 3 | 0.145 | 3.8. |
| 2 | F–2 | 5.9 | 0.291 | bent, but did not break. |
| 3 | F–3 | 11.8 | 0.582 | 6.4. |
| 4 | F–4 | 27.3 | 1.45 | 1.9. |
| 5 | F–5 | 50.0 | 2.91 | 1.4. |

EXAMPLE 3

This example shows the effect on impact strength of using high molecular weight, coupled, unsaturated polyesters, as contrasted with lower molecular weight unsaturated polyesters, in making styrene copolymers.

A series of styrene copolymers, identified as tests 1–3, was made by interpolymerizing 90 parts styrene and 10 parts polyester. The series comprised pairs of tests, each pair differing from the other pairs as to the proportion of unsaturated acid in the acids from which the polyesters were made. One member of each pair, referred to as sub-test "a," was a copolymer of styrene and one of the aforementioned, high molecular weight, coupled polyesters F–1 through F–3, respectively. The other member of each pair, referred to as sub-test "b," was a copolymer of styrene and a mechanical mixture of the aforementioned polyesters C and E in the same proportions that had been used to make the corresponding coupled polyesters F–1 to F–3. In other words, in each pair of copolymers of styrene and unsaturated polyester, the same empirical composition of 1,2-propylene glycol polyesters of sebacic and fumaric acid was used, but in one member of the pair, the polyester was a high molecular weight (circa 12,000 to 15,000) coupled polyester, while the other member of each pair was a mixture of the corresponding ordinary, low molecular weight (circa 2,500) uncoupled polyesters.

Each copolymer was made by keeping the mixture of styrene and polyester in a sealed glass ampoule at a temperature of about 80° C. for three days, 100° C. for one day, 125° C. for one day, and 150° C. for one day. The copolymers were compression molded at a temperature of 160 C. into test bars having a rectangular cross-section of ½ inch by 1/10 inch. The impact strength of the copolymers, determined on these test bars in the Izod impact test as described in Example 1, is shown in Table IV in terms of the inch-pounds at break. In the table, the copolymers of 90 parts of styrene and 10 parts of polyester are identified by reference to the previously described polyesters C and D and the coupled polyesters F–1 through F–3, with the compositions being given in parts of the polyester per 100 parts of the copolymer, by weight. The table further shows the proportion of unsaturated acid computed in terms of the average mole percent of unsaturated acid based on the total acids combined in the polyester composition used for each test. The table also shows the proportion of unsaturated acid chemically combined in each copolymer in terms of the weight percent of such chemically combined unsaturated acid based on the total copolymer resin composition.

Table IV

| Test | Polyester | | | | | | Unsaturated Acid | | Impact, Inch-Pounds | |
|---|---|---|---|---|---|---|---|---|---|---|
| | Kind | Parts Per 100 Parts Copolymer | | | | | Mole Percent In Polyester | Weight Percent In Copolymer | Coupled Polyester Copolymer | Uncoupled Polyester Copolymer |
| | | C | E | F-1 | F-2 | F-3 | | | | |
| 1 a | Coupled | | | 10 | | | 3 | 0.145 | 3.8 | |
| b | Uncoupled Mixture | 9.5 | 0.5 | | | | 3 | 0.145 | | 0.6 |
| 2 a | Coupled | | | | 10 | | 5.9 | 0.291 | bent, but did not break. | |
| b | Uncoupled Mixture | 0.0 | 1.0 | | | | 5.9 | 0.291 | | 2.9 |
| 3 a | Coupled | | | | | 10 | 11.8 | 0.582 | 6.4 | |
| b | Uncoupled Mixture | 8.0 | 2.0 | | | | 11.8 | 0.582 | | 0.7 |

From the foregoing examples it is evident that new copolymers, having remarkable toughness and resistance to breakage, are obtained by interpolymerizing monovinylbenzene compounds, particularly styrene, and elastic, linearly polyesters, which polyesters are characterized by containing, in chemically combined form, a limited proportion of a polymerizable reactive ethylene-alpha,beta-dicarboxylic acid and further characterized by a high molecular weight obtained by coupling of hydroxy-terminated polyesters with a hydroxy-reactive difunctional organic compound selected from the group consisting of diisocyanates and diketenes.

Other compositions may be made applying the principle of my invention instead of those described, change being made as to the substances employed and the procedures herein disclosed, within the purview of the appended claims.

I claim:

1. A solid, moldable resin consisting essentially of the product of conjoint polymerization of (A) from 60 to 99 parts by weight of at least one monovinyl aromatic compound of the benzene series having a vinyl group attached to a carbon atom of the benzene ring and (B) from 40 to 1 parts by weight of a high molecular weight, polymerizably reactive polyester reaction product of (1) a minor amount of an organic compound selected from the group consisting of diketenes and organic diisocyanates and (2) a major amount of a polyester comprising the reaction product of (a) a mixture of dicarboxylic acids comprising from 1 to 30 mole percent of a polymerizably reactive, ethylene-alpha,beta-dicarboxylic acid and from 99 to 70 mole percent of a polymerizably unreactive, non-ethylenic dicarboxylic acid and (b) at least one dihydric alcohol in an amount in excess of the stoichiometric equivalent of the dicarboxylic acids.

2. The resin of claim 1 further characterized in that the polymerizably reactive, ethylene-alpha,beta-dicarboxylic acid chemically combined in the polymerizably reactive polyester reaction product is from 0.1 to 1.5 percent by weight of the conjoint polymerization product.

3. A solid, moldable resin consisting essentially of the product of conjoint polymerization of (A) 60 to 99 parts by weight of styrene and (B) 40 to 1 parts by weight of a high molecular weight, polymerizably reactive polyester reaction product of (1) a minor amount of meta-toluene diisocyanate and (2) a polyester comprising the reaction product of (a) a mixture of dicarboxylic acids, comprising from 1 to 30 mole percent of fumaric acid and from 99 to 70 mole percent of sebacic acid, and (b) 1,2-propylene glycol in an amount in excess of the stoichiometric equivalent of the dicarboxylic acids, the fumaric acid chemically combined in the polymerizably reactive polyester reaction product being from 0.1 to 1.5 percent by weight of the conjoint polymerization product.

4. A polymerizable composition consisting essentially of (A) from 60 to 99 percent by weight of at least one monovinyl aromatic compound of the benzene series having a vinyl group attached to a carbon atom of the benzene ring and (B) from 40 to 1 percent by weight of at least one polymerizably reactive, high molecular weight, linear, elastic polyester reaction product of (1) a minor amount of an organic compound selected from the class consisting of diketenes and organic diisocyanates and (2) a major amount of a lower molecular weight polyester comprising the reaction product of (a) a mixture of dicarboxylic acids comprising from 1 to 30 mole percent of a polymerizably reactive ethylene-alpha,beta-dicarboxylic acid and (b) at least one dihydric alcohol in an amount in excess of the stoichiometric equivalent of the dicarboxylic acids, the ethylene-alpha,beta-dicarboxylic acid chemically combined in the polyester composition being in an amount corresponding to from 0.1 to 1.5 percent by weight of the polymerizable composition.

5. A polymerizable composition consisting essentially of (A) from 60 to 99 percent by weight of styrene and (B) from 40 to 1 percent by weight of a polymerizably reactive, high molecular weight, linear, elastic polyester reaction product of (1) a minor amount of meta-toluene diisocyanate and (2) a major amount of a lower molecular weight polyester composition comprising, as radicals chemically combined in polyester molecules, (a) 1,2-propylene glycol, (b) sebacic acid and (c) fumaric acid in a proportion corresponding to not more than 30 mole percent of all of the dicarboxylic acid radicals, the number of 1,2-propylene glycol radicals being in excess of the total number of dicarboxylic acid radicals and the fumaric acid chemically combined in the polyester composition being in an amount corresponding to from 0.1 to 1.5 percent by weight of the polymerizable composition.

6. A process of making a tough, impact-resistant, solid, moldable resin which comprises the steps of (I) forming a polymerizable mixture consisting essentially of from 60 to 99 parts by weight of at least one monovinyl aromatic compound of the benzene series having a vinyl group attached to a carbon atom of the benzene ring and from 40 to 1 part by weight of a high molecular weight, polymerizably reactive polyester which is the reaction product of (a) a minor amount of an organic compound selected from the group consisting of diketenes and organic diisocyanates and (b) a major amount of at least one member of the group consisting of (1) polyesters of dicarboxylic acids and comprising the radicals of at least one polymerizably reactive ethylene-alpha,beta-dicarboxylic acid and the radicals of at least one dihydric alcohol in excess of the radicals of the dicarboxylic acids and (2) mixtures of the polyesters defined in (1) and polyesters containing radicals of at least one non-ethylene dicarboxylic acid and the radicals of at least one dihydric alcohol in excess of the radicals of the dicarboxylic acid, in which high molecular weight, polymerizably reactive polyester from 1 to 30 mole percent of the radicals of all of the dicarboxylic acids chemically combined therein are radicals of an ethylene-alpha,beta-dicarboxylic acid, which mixture as prepared in step I contains the equivalent of from 0.1 to 1.5 percent by weight of an ethylene-alpha,beta-dicarboxylic acid in chemically combined form, and (II) heating said mixture to effect polymerization thereof.

References Cited in the file of this patent

UNITED STATES PATENTS

| | | |
|---|---|---|
| 2,255,313 | Ellis | Sept. 9, 1941 |
| 2,424,884 | Cook et al. | July 29, 1947 |
| 2,591,884 | Simon et al. | Apr. 8, 1952 |
| 2,639,252 | Simon et al. | May 19, 1953 |